F. J. SCHLINK.
METHOD AND MACHINE FOR PERFORMING INTEGRATIONS.
APPLICATION FILED MAR. 20, 1919.
1,333,637.  Patented Mar. 16, 1920.
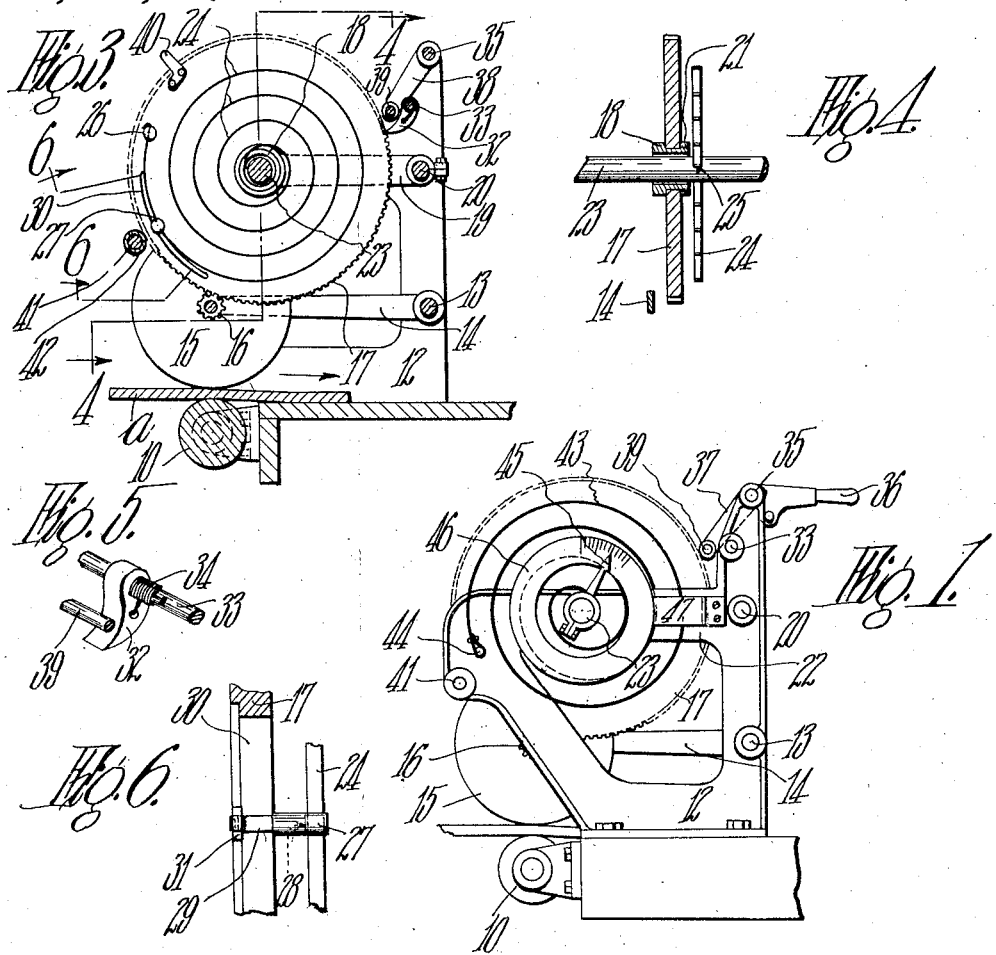
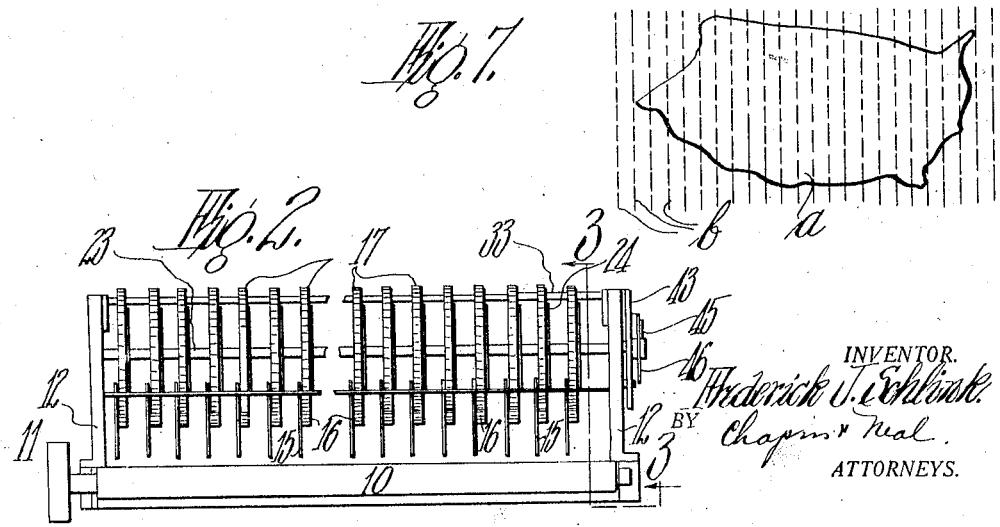
INVENTOR.
Frederick J. Schlink
BY Chapin & Neal
ATTORNEYS.

UNITED STATES PATENT OFFICE.

FREDERICK J. SCHLINK, OF WASHINGTON, DISTRICT OF COLUMBIA.

METHOD AND MACHINE FOR PERFORMING INTEGRATIONS.

1,333,637.     Specification of Letters Patent.     Patented Mar. 16, 1920.

Application filed March 20, 1919. Serial No. 283,832.

*To all whom it may concern:*

Be it known that I, FREDERICK J. SCHLINK, a citizen of the United States of America, residing at Washington, in the District of Columbia, have invented certain new and useful Improvements in Methods and Machines for Performing Integrations, of which the following is a specification.

My invention relates to a method and a machine for performing integrations of any desired order, and more especially for measuring the area of irregular sheets of material, which may be of any relatively thin substance, and is specifically designed for measuring the area of hides.

It has for its object to improve existing machines for similar purposes by reducing the errors inherent in the former construction, by simplifying the mechanism, by rendering the mechanism much more compact, and in various other matters which will appear from a description thereof.

Machines for measuring areas have been proposed comprising a number of parallel measuring disks which were rotated by the passage of the hide or other material to be measured in a degree proportional to the width of the hide on a line through each roller. Those disks outside the path of the hide received no rotation, while a maximum rotation was imparted to those disks under which passed the widest part of the hide. The amounts of rotation of all the disks were, so to speak, averaged by a system of equalizing levers in the nature of a family of swingletrees and doubletrees. The average rotation thus determined was indicated by the rotation of a pointer or dial to which the final doubletree of the series was connected.

By reason of the large number of joints which this construction required, there was great opportunity for lost motion, with a consequent large error in the reading. Further, any increase in the number of measuring disks, to accommodate larger hides or to improve the accuracy of the approximation necessarily involved in the integration of strips of finite width, was inevitably accompanied by a multiplication of the points of lost motion, and an increase in the already large error. My invention is designed, among other things, to remedy these defects.

Referring to the accompanying drawings, in which like numerals represent like parts throughout,—

Figure 1 is an end view of a machine embodying my invention;

Fig. 2 is a side elevation of the same, some parts being omitted and the machine being shown as broken away in the middle;

Fig. 3 is a section on line 3—3 of Fig. 2;

Fig. 4 is a section on line 4—4 of Fig. 3;

Fig. 5 is a detail of a pawl for holding one of the measuring units in position;

Fig. 6 is a section on line 6—6 of Fig. 3, showing the adjustment for the spring of one of the measuring units; and Fig. 7 is a diagram showing the method of measuring the area of an irregular surface, as, for example, a hide.

Briefly, my invention consists in measuring an area by totalizing forces proportionate to the lengths of parallel lines or ordinates $b$, preferably equally spaced, drawn across the surface whose area is to be measured. This is equivalent to adding up the lengths of these lines themselves, and the result, when multiplied by a factor proportional to the spacing of the lines and their number, is proportional to the area to be measured. Referring to Fig. 7, it is clear that, if the length of each of the parallels $b$ shown is measured between the opposite edges of the stock and multiplied by the distance between the lines, the result will be a series of small areas corresponding approximately to areas of the stock each having one of the parallels for a center and extending halfway to the adjacent parallels. By totalizing these small areas, the whole area is determined. By my invention, instead of adding distances directly, a succession of forces proportional to the lengths of the several parallels is totalized, and the total converted to area either by calibration or by multiplying the total force by a factor. By adding forces rather than motions or displacements, I am enabled to do away with much complexity and to avoid almost entirely the effect of lost motion. It is preferable to add these forces in the form of elastic tensions, torsions, or compressions by the use of springs, as this lends itself to balanced conditions in which lost motion is more completely eliminated.

My invention will now be described with particular reference to the drawings, which show the preferred embodiment thereof, in which spiral springs are used as agencies for converting the distance measurements into forces. As in prior machines for measuring areas of stock such as hides, the work *a* is fed through the machine by a long feed roller 10, coupled to a source of power in any convenient manner, as by a pulley 11. Brackets 12, at either end of the machine, support a shaft 13 about which levers 14 are free to turn. The end of each of these levers carries a measuring disk 15 and a small pinion 16. The passage of the stock under each measuring disk raises it, this action being permitted by the free mounting of lever 14, and meshes pinion 16 with a gear 17, supported on a sleeve 18, forming part of a bracket 19, fast on a rod 20, fixed in brackets 12. This gear, with its mounting and appended parts, forms part of the totalizing mechanism, in which my invention differs from the machines formerly used. A collar 21 secures gear 17 against endwise movement.

Passing freely through all the sleeves 18 and having bearing in extensions 22 of brackets 12 is a shaft 23 carrying, adjacent each gear 17, a hairspring 24. The inner end of each spring is attached to the shaft in any suitable manner, as by passing its end into a slot 25, and its outer end is secured to a pin 26 on gear 17. The springs themselves may be made of a wide range of stiffness, provided that all the springs are of closely equal strength and that the tension is not sufficient to cause slippage of the measuring disks against the stock.

Provision is made for adjusting the springs by a pin 27 having a slot 28 in its outer end to snugly receive the spring and having a squared portion 29 running in a slot 30 in gear 17. The latter slot is widened on the side opposite the spring to accommodate a nut 31 for holding the pin in adjusted position. By shifting the pin along in the slot, the active length of the spring is varied, the action being similar to the adjustment of the balance spring in a watch. The form of adjustment shown is illustrative merely, and equivalent results may be obtained by other means. For example, the spring 24 may be slidably clamped in pin 26 or be attached thereto by an adjustable screw.

To hold the gears 17 in the position to which they are turned, a pawl 32 is provided for each. The pawls are loosely mounted on a rod 33 extending between the brackets 12 and are pressed lightly against the gear as by springs 34, best shown in Fig. 5. No ratchet teeth are provided, as the gear teeth are of fine pitch and serve the purpose. To trip the pawls a rod 35, rotatable in brackets 12, has a handle 36 and arms 37, 38, carrying at their ends a rod 39 which, when the handle is swung upwardly, contacts with the pawls and moves them clear of the gear teeth.

To stop the gears 17 in what may be called a zero position, when the machine is reset for the purpose of taking a new reading, lugs 40 are provided, adapted to abut against a rod 41, preferably covered by a rubber tube 42 to reduce the shock. Each spring is placed under an initial tension when it is installed in the machine, and, when the pawls 32 are tripped, the springs force the gears 17 to turn and bring lugs 40 against buffer 42.

The shaft 23 is turned by the tension of the several springs 24 against the tension of a spring 43, located at one end of the shaft, and which may be wound in a direction opposite to that of springs 24. The inner end of this spring is fastened to the shaft 23, and the outer end to a pin 44 on bracket 12. For the purpose of calibration, this spring is preferably fitted with an adjustment similar to that supplied for springs 24, although this has not been shown in the drawings. The amount of rotation of the shaft 23 is indicated by a pointer 45 fixed to the end of the shaft, and a dial 46, mounted on a bracket 27 extending from one of the brackets 12, or by any other suitable mechanism which may be of a type which will magnify the motion of shaft 23, if desired.

A brief description of the operation of the device will now be given. The stock to be measured is passed over roll 10 in the direction of the straight arrow in Fig. 3. As soon as any part of the stock comes under a measuring disk 15, the latter is raised, bringing pinion 16 into mesh with gear 17. Further motion of the stock causes rotation of gear 17 and consequent tensioning of spring 24. The same sequence takes place with all measuring units which are influenced by the passage of the stock. The amount of rotation given to shaft 23, and consequently to pointer 45, depends upon the total tension given to springs 24 and the resistance offered by spring 43. The gears of those measuring units whose measuring disks are not acted upon by the stock remain stationary with lugs 40 against buffer 42, but the springs of these units are slacked off by the rotation of shaft 23. The amount of initial tension given to each spring is sufficient in amount to accommodate the maximum rotation likely to be given to shaft 23, so that lugs 40 will remain in contact with the buffer at all times when the gears are not rotated by the movement of the stock past the measuring disks. It is not necessary that the initial tensions of the springs shall be equal, but it is desirable that the springs shall all be of the same strength; that is, that the ratio between spring tension or torque and the rotation producing it shall be equal for all units. This loss of initial tension by the inactive springs affects the reading on dial 46 in the matter of calibration only, no matter how many springs are idle.

Dial 46, or such other indicating device as may be used, may be graduated in arbitrary divisions, in units of force or in units of area. In the first two instances, calibration charts or a multiplying factor must be used to reduce the dial reading to terms of area, but in the latter case the dial itself is calibrated. After the piece of stock has been run through the machine and the reading taken, the pawls are tripped, allowing the springs and gears to return to their zero position, and the machine is ready for another operation.

It will be noted that shaft 23 has but two bearing points, as the gears 17 have bearing, not on the shaft, but on sleeves 18 spaced from the shaft. This eliminates very largely the errors due to friction as the shaft is subjected merely to the turning effects of the various springs. All the bearings have been shown as being of the plain type, but it will be understood that it may be desirable to use any one of the common types of anti-friction bearings, such as balls or rollers. These form no part of my invention and hence have not been illustrated.

The integration accomplished by the method above described corresponds to the function $\Sigma a$. By suitable variations being made in the tensions of the various springs, integrations corresponding to the functions $\Sigma ay$ or $\Sigma ay^2$, etc., can be determined. For example, if it is desired to find the moment of inertia about an axis passing through the left-hand margin of the machine, the springs are made of strengths respectively proportional to the square of the distance of each spring from the axis. As the main utility of my invention will be found in the measurement of areas, I have described it with that use in the foreground. It will be understood, however, that higher integrations than areas can be performed without departing from my invention.

While I have shown one form of machine embodying my invention, I do not deem myself limited thereto, as it may receive various specific embodiments, and I have defined what I consider the scope of my invention in the appended claims.

I claim:—

1. A method of measuring areas, consisting in storing up a plurality of tensions individually proportionate to the lengths of spaced ordinates of the area to be measured, compounding such tensions, and translating the result into terms of area.

2. In a device of the character described, a plurality of spaced measuring devices, spring means associated with each device for converting its measuring movement into a proportionate force, means for totalizing all the forces, and means for indicating the total.

3. In a device of the character described; a plurality of measuring disks; a spring associated with each disk; means to cause relative motion between the stock whose area is to be measured and the disks, whereby rotation is imparted to each disk and the spring associated therewith is tensioned; and means to totalize the tensions of all the springs.

4. In a device of the character described, a plurality of measuring disks, a spring associated with each disk, connections between the disks and springs whereby the springs are tensioned by the rotation of the disks, means for totalizing the tension of all the springs, means for indicating the total, and means for holding all the springs in their tensioned position until a reading can be taken.

5. In a device of the character described, a shaft, a plurality of springs each having one end attached to the shaft, means for imparting to each spring a tension proportional to an ordinate of the area to be measured, a spring opposing the tension of the first named springs, and means actuated by the shaft for indicating the total tension.

6. In a device of the character described, a shaft, a plurality of springs each having one end attached to the shaft, means for imparting to each spring a tension proportional to an ordinate of the area to be measured, a spring opposing the tension of the first named springs, means for indicating the total tension, means for holding the springs in their tensioned position until a reading can be taken, and means for returning the springs to their initial position.

7. In a device of the character described; a plurality of measuring disks; means for feeding the stock to be measured past the disks, whereby the disks are rotated proportionately to the width of the stock; a spring associated with each disk; a shaft upon which one end of each spring is mounted; connections between the other end of the springs and their corresponding disks, whereby the springs are tensioned proportionately to the rotation of their respective disks; a spring on the shaft adapted to resist the rotation of the shaft; and a scale for indicating the amount of rotation of the shaft.

8. In a device of the character described; a plurality of measuring disks; means for feeding the work to be measured past the disks, whereby the disks are rotated proportionately to the width of the work; a spring associated with each disk; a shaft upon which one end of each of the springs is mounted; connections between the other end of the springs and their corresponding disks, whereby the springs are tensioned proportionately to the rotation of their respective disks; a plurality of pawls constructed to hold each spring in its tensioned position; a spring on the shaft adapted to resist the rotation of the shaft; a scale for indicating the amount of rotation of the shaft; and means for releasing all the pawls.

9. In a device of the character described, a shaft, a plurality of members rotatably mounted concentric with the shaft but out of contact therewith, a spring connecting each member with the shaft, a totalizing spring attached to the shaft and opposing the tensions of the first-named springs, means to impart to the members respective rotations proportionate to spaced ordinates of the area to be measured, and means for indicating the amount of rotation of the shaft.

10. In a device of the character described, a shaft, a plurality of gears rotatably mounted concentric with the shaft but out of contact therewith, a spring connecting each gear to the shaft, a totalizing spring attached to the shaft and opposing the tension of the first-named springs, a plurality of measuring disks each operatively connected to one of the gears, and means for indicating the amount of rotation of the shaft.

11. In a device of the character described, a totalizing shaft, a plurality of measuring members concentric with the shaft but out of contact therewith, and means to impart to the shaft from each member a rotation proportionate to the measuring movement of such members.

FREDERICK J. SCHLINK.